United States Patent
Buffenoir et al.

[11] Patent Number: 5,412,183
[45] Date of Patent: May 2, 1995

[54] METHOD AND DEVICES FOR INDUCTION HEATING DURING THE PASSAGE OF A METALLURGICAL PRODUCT OF ELONGATED SHAPE

[75] Inventors: Marc Buffenoir, Metz; Philippe Georges, Terville; René Pierret, Metz, all of France

[73] Assignee: Rotelec, Bagnolet Cedex, France

[21] Appl. No.: 946,329

[22] PCT Filed: May 7, 1991

[86] PCT No.: PCT/FR91/00381

§ 371 Date: Apr. 20, 1993

§ 102(e) Date: Apr. 20, 1993

[87] PCT Pub. No.: WO91/17644

PCT Pub. Date: Nov. 14, 1991

[30] Foreign Application Priority Data

May 10, 1990 [FR] France .................. 90 05824

[51] Int. Cl.⁶ .............................................. H05B 6/40
[52] U.S. Cl. ................................. 219/637; 219/656; 219/672; 148/572; 266/129
[58] Field of Search ............ 219/10.61 R, 10.71, 219/10.69, 10.79, 10.75, 10.43, 637, 639, 635, 636, 672, 676, 656, 673; 266/129; 148/567, 568, 572

[56] References Cited

U.S. PATENT DOCUMENTS

| | | | |
|---|---|---|---|
| 2,873,344 | 2/1959 | Kocks et al. | 219/10.43 |
| 2,902,572 | 9/1959 | Lackner et al. | 219/10.61 R |
| 3,444,346 | 5/1969 | Russell et al. | 219/10.61 R |
| 3,663,782 | 5/1972 | Emerson | 219/10.43 |
| 4,587,392 | 5/1986 | Chaussé et al. | 219/10.71 |
| 4,708,325 | 11/1987 | Georges | 219/10.61 R |
| 4,849,598 | 7/1989 | Nozaki et al. | 219/10.41 |

FOREIGN PATENT DOCUMENTS

| | | |
|---|---|---|
| 170556 | 2/1986 | European Pat. Off. . |
| 266470 | 5/1988 | European Pat. Off. . |
| 1034097 | 7/1953 | France . |
| 2315502 | 10/1973 | Germany . |
| 1339571 | 12/1973 | United Kingdom . |

*Primary Examiner*—Philip H. Leung
*Attorney, Agent, or Firm*—Oblon, Spivak, McClelland, Maier, & Neustadt

[57] ABSTRACT

The product (11) is in relative motion in the direction (12) of its axis with respect to at least one magnetic inductor (10, 10'). The metallurgical product (11) is subjected to at least two magnetic fluxes (19, 19') having non-parallel directions which are transverse with respect to the longitudinal direction of the product (11). The heating device may advantageously consist of two C-shaped magnetic yokes (14, 14') spaced apart and angularly offset along the axial direction (12) of advance of the product (11).

10 Claims, 2 Drawing Sheets

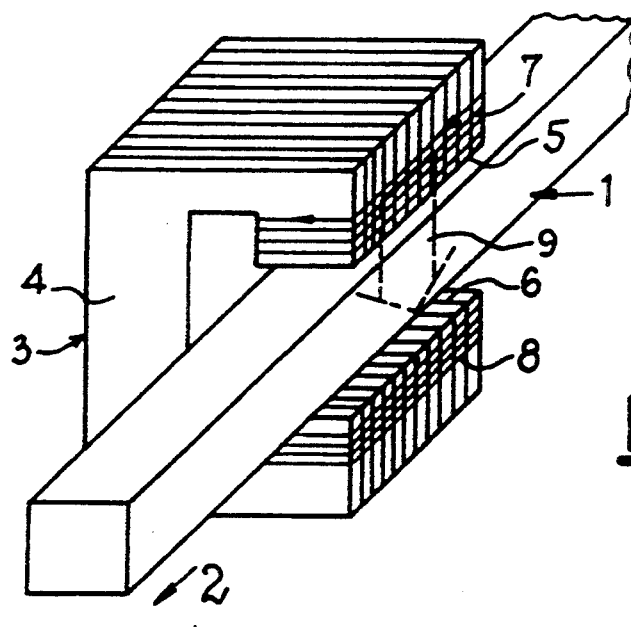
FIG.1
FIG.2
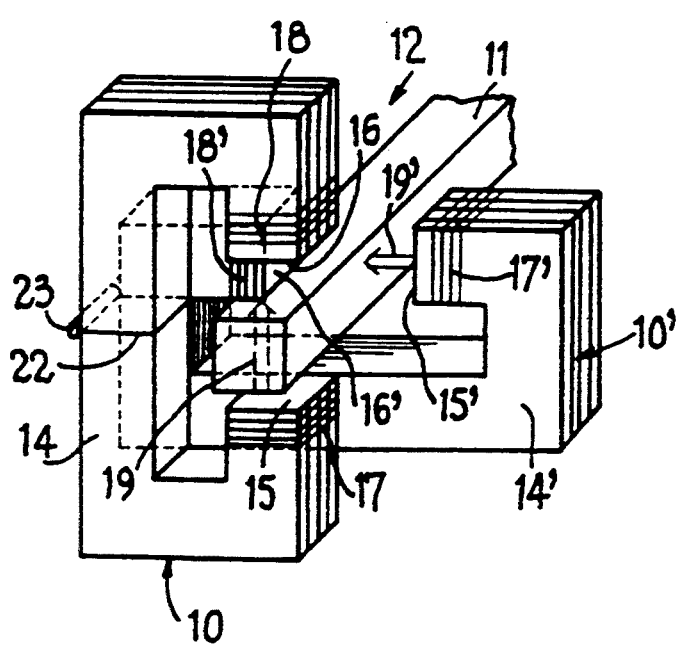
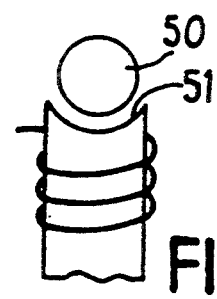
FIG.5
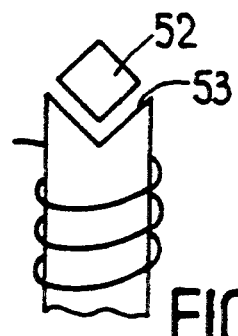
FIG.6

METHOD AND DEVICES FOR INDUCTION HEATING DURING THE PASSAGE OF A METALLURGICAL PRODUCT OF ELONGATED SHAPE

TECHNICAL FIELD

The invention relates to a method and a device for induction heating during the passage of a metallurgical product of elongate shape.

BACKGROUND ART

During operations for working and converting long metallurgical products, it may be necessary to heat the product advancing through an installation such as a rolling mill which works and converts the product. This heating may be necessary in particular when it is desired to treat the product thermomechanically at the rolling heat or to provide a supply of heat allowing a given level of enthalpy of the product to be obtained, for example before it is shaped.

This heating may be obtained conventionally by exposing the surface of the product to one or more heating flames produced by one or more burners disposed on the path of the advancing product.

It is also known, in particular in the case of long products with circular cross section, to use inductors in the form of solenoids which include one or more windings in which the product is passed, in the direction of the axis of the windings which coincides with the axis of the long product. The windings of the inductor are supplied with alternating current and subject the product to a magnetic flux passing through the product in the axial direction and generating induced currents in the cross section of the product. Thus, that part of the long product which is advancing through the inductor is heated by induction, this heating method having the advantage of having great flexibility in use and high speed as well as a satisfactory thermal efficiency.

However, the use of an inductor in the form of a solenoid has certain drawbacks. First, the advancing product is surrounded by the inductor, so that it is very difficult if not impossible to adjust the relative positioning of the product with respect to the inductor, unless a solenoid is used whose internal diameter is very substantially greater than the diameter of the product. It is obvious that, in this case, a large decrease in the efficiency of the inductor and therefore in the maximum power which can be transmitted to the product must be accepted.

Furthermore, the engaging of the product in the inductor or in the successive inductors disposed on its route, present difficulties which are due to the small clearance existing between the product and the internal surface of the solenoid which is necessary in order to obtain sufficient efficiency and for the high speed of advance of the product, in particular when the heating is performed on the product at the output of a mill train.

In the case where the product or semifinished product being converted has shape defects, for example deformations in the shape of ski tips at its ends or undulations, it is not possible to modify the passage cross section of the solenoid in order to allow these deformed parts to pass, so that it is necessary to remove the inductor from the zone of passage of the product and to interrupt the heating, in order to avoid incidents which might have disastrous consequences.

In the case of long products having a cross section of non-circular shape and for example in the case of blooms or billets having a square-shaped cross section, inductors in the form of solenoids do not allow simultaneous provision of homogeneous heating of the product over its whole cross section and in particular in the vicinity of the corners of the square cross section and provision of heating at a high specific power.

Finally, in order to obtain heating of a sufficient amplitude, it may be necessary to use installations whose length determined by the length of the solenoids may be large. Furthermore, these relatively bulky installations are limited as to the maximum power which they can transmit to the product.

In the case of heating sheet metal edges on strip mill trains, it has been proposed to use a C-shaped inductor disposed laterally with respect to the advancing sheet metal, so that the poles of this inductor are placed on either side of the sheet metal, in the vicinity of the edge which is to be heated. This edge is passed through by a magnetic flux which is substantially perpendicular to the sheet metal which induces currents which have a high intensity, in particular in the vicinity of the external margin of the sheet metal. Such a method employing a magnetic flux which is transverse with respect to the edge is not, however, applicable to providing homogeneous heating of a long product over its whole cross section and to producing localised heating of this product in given zones such as the corners of a polygonal cross section.

DISCLOSURE OF INVENTION

The object of the invention is therefore to provide a method of induction heating during the passage of a metallurgical product of elongated shape in relative motion in the direction of its axis with respect to at least one magnetic inductor, this method allowing homogeneous heating to be produced over the whole cross section of the product or localised heating of the product, whilst being simple to implement and efficient, regardless of the shape of the cross section and the speed of advance of the product, even when the product has deformations in its longitudinal direction.

For this purpose, the metallurgical product is subjected to at least two magnetic fluxes having non-parallel directions, which are transverse with respect to the longitudinal direction of the product.

The invention also relates to a device for heating during the passage of a metallurgical product including one or more inductors of appropriate shape allowing the method of the invention to be implemented.

In order to explain the invention more clearly, there will now be described, by way of non-limiting examples and with reference to the figures attached as an annex, several embodiments of inductors allowing the method according to the invention to be implemented.

BRIEF DESCRIPTION OF THE DRAWINGS

FIG. 1 is a perspective view showing a C-shaped inductor producing a magnetic field and flux with a direction which is transverse with respect to the longitudinal direction of the product with square cross section advancing through the air gap of the inductor.

FIG. 2 is perspective view of a first embodiment of an inductor according to the invention consisting of two C-shaped magnetic circuits spaced apart along the longitudinal direction of the advancing product.

FIG. 5 is a diagrammatic front view of one pole of an inductor allowing the method according to the invention to be implemented in the case of a product with circular cross section.

FIG. 6 is a diagrammatic front view of one pole in an inductor allowing the method according to the invention to be implemented, in the case of a long product with square cross section.

BEST MODE FOR CARRYING OUT THE INVENTION

Figure 3:
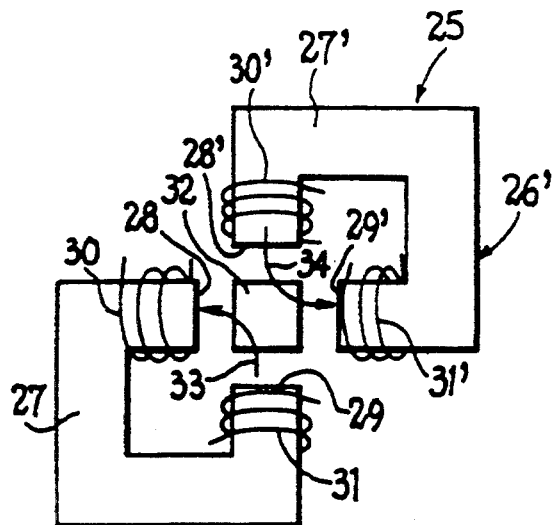
FIG. 3 is a diagrammatic front view of a second embodiment of an inductor according to the invention consisting of two magnetic circuits situated substantially in the same plane which is perpendicular to the axis of the advancing product.

FIG. 1 shows a long product 1 with square cross section (i.e. with an axially symmetrical shape) as it advances, along the direction and sense of the arrow 2, through the air gap of a C-shaped inductor 3. The inductor 3 includes a laminated magnetic yoke 4 constituting two poles 5 and 6 situated opposite each other and between which the air gap, through which the advancing product 1 passes, is formed. The ends of the magnetic yoke 4 situated in the vicinity of the poles 5 and 6 carry windings 7 and 8 through which an alternating current travels at a given frequency and intensity. The windings 7 and 8 produce a magnetic field which is channelled by the yoke 4 so as to produce a transverse magnetic flux 9 which passes through the product 1. The magnetic flux 9 generates the formation of induced currents in the product 1 which ensure a certain heating of this product.

Although the device shown in FIG. 1 allows a higher power density to be transmitted to the product than with an inductor in the form of a solenoid, and the C-shaped inductor allows, as will be explained hereinbelow, the introduction of the product and the passage of deformed zones to be facilitated, the nonhomogeneous distribution of the heat transmitted to the product by the inductor, which is manifested by a cold zone in the vicinity of the axial plane of the product parallel to the induced flux 9, prohibits the use of such an inductor for heating during the passage of long products, for example with a square cross section or circular cross section.

FIG. 2 shows a first embodiment of an inductor allowing the method according to the invention to be implemented, this inductor consisting of two C-shaped magnetic circuits 10 and 10' disposed so as to be spaced apart along the axial direction 12 of advance of the product 11 which is to be heated during its passage.

Each of the magnetic circuits 10 and 10' is constituted in the same manner as the inductor 3 represented in FIG. 1 and includes a magnetic yoke 14 (14') made in a laminated form and having two opposite end parts 15 and 16 (15' and 16' in the case of the inductor 14') constituting the poles of the corresponding inductors 10 and 10'. Windings 17 and 18 (17' and 18' in the case of the inductor 10') are wound around the end parts of the yokes 14 and 14' respectively, in the vicinity of the poles. Such an inductor is in particular described in document FR-A-2,583,249 whose teaching is here incorporated by reference.

The inductors 10 and 10' are placed perpendicularly to each other, so that the poles 15 and 16 on the one hand and 15' and 16' on the other hand constitute plane faces which are mutually perpendicular. Furthermore, the inductors 10 and 10' are spaced apart along the direction 12 of advance of the product, so that no magnetic interaction is produced between the fields produced by the inductors 10 and 10'.

The inductors 10 and 10' subject the advancing product 11 to two induced magnetic fluxes 19 and 19' respectively, in two zones of the product which are separated by a certain axial length.

The magnetic fluxes 19 and 19' are orthogonal and, in the case of a product such as the product 11 with square cross section, these fluxes are each perpendicular to two lateral faces of the product 11.

Figure 7:
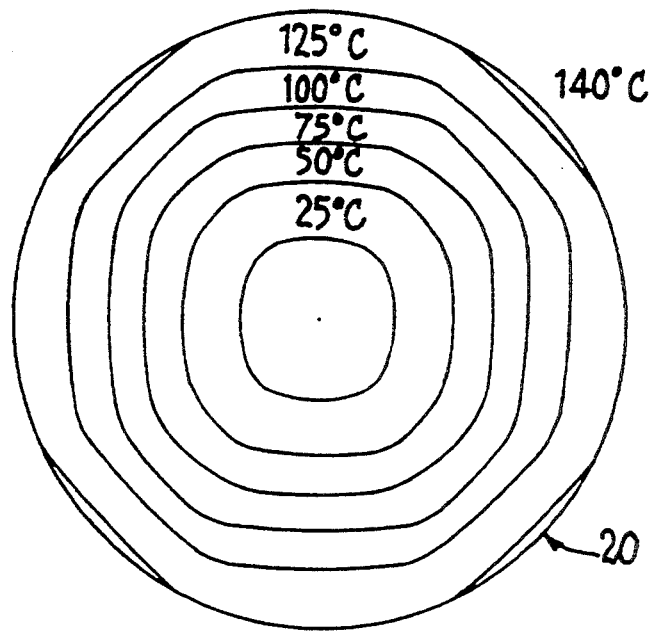
FIG. 7 is a view diagrammatically representing the distribution of the isotherms in the circular-shaped cross section of a long product during heating using a device as represented in FIG. 2.

FIG. 7 represents the distribution of the isotherms over the cross section of a product 20 advancing within the air gaps of a double inductor including two C-shaped parts as represented in FIG. 2, this product 20 being subjected to two transverse and orthogonal induced fluxes such as the fluxes 19 and 19'.

The product 20 has a diameter of 75 mm and the air gaps of the circuits 10 and 10' a width of 150 mm. The two magnetic circuits constituting the double inductor are spaced apart by 400 mm.

The windings are supplied with alternating current at a frequency of 340 Hz so as to subject the length in question of the product (400 mm) to a power of 90 kW for 15 seconds, for the speed of advance used.

It should be noted that the isotherms are substantially symmetrical with respect to the axis of the product and have a shape close to the circular cross section of this product. This shape and this distribution of the isotherms manifest good homogeneity of the heating over the cross section of the product.

This homogeneity and the distribution of the isotherms are comparable to the homogeneity obtained in the case of heating using a solenoid. Furthermore, the electrical efficiency of the inductor is practically identical to the electrical efficiency of an inductor in the form of a solenoid. It is to be noted that the electrical efficiency depends on the value of the air gap and that adjustment of this value as a function of the dimensions and the geometry of the product is facilitated in the case of a device as represented in FIG. 2 including a C-shaped magnetic yoke. (It is specified that here and throughout the description, the air gap is the space between the two pole faces of the same magnetic circuit).

In fact, each of the C-shaped yokes may be made in two parts which are jointed together in the vicinity of a junction plane 22 so as to be able to pivot around a spindle 23. It is thus possible to space apart the two poles and to increase the air gap of the inductors 10 and 10', at the moment of engaging the product and in the presence of deformations of the long product in its axial direction. It is thus possible considerably to reduce the clearance between the external surface of the product and the poles of the inductors, at the air gap.

Furthermore, despite the use of magnetic yokes spaced apart along the length of the product, the total length of the inductor device may be very much less than the length of an inductor in the form of a solenoid used for heating a similar product. The high surface power density transmitted by the inductor according to the invention to the advancing product allows the bulk of the heating installation to be reduced.

FIG. 3 represents one variant embodiment of an inductor allowing the method according to the invention to be implemented. The inductor 25 includes two magnetic circuits 26 and 26' each consisting of a yoke 27 (27') made in a laminated form and having a square-shaped cross section which is interrupted in order to constitute two pole faces 28 and 29 (28' and 29' in the case of the yoke 27') of planar shape and mutually perpendicular and constituting cross sections of two perpendicular branches of the square-shaped frame of the corresponding yoke. The ends of the yoke which are next to the poles 28 and 29 (or 28' or 29') are surrounded by the windings 30 and 31 respectively (30' and 31' in the case of the yoke 27').

The magnetic circuits 26 and 26' are disposed substantially in the same cross-sectional plane of the advancing product 32 which is to be heated.

A first air gap is delimited between the poles 28 and 29 facing two perpendicular faces of the product and a second air gap between the poles 29' and 28' facing the two other perpendicular faces of the product. The windings 30 and 31 and the windings 31' and 30' are supplied with alternating current at a given frequency and optionally with a certain phase shift, so as to subject the product 32 to two fluxes 33, 34 which are transverse with respect to the longitudinal direction of the product 32, in the vicinity of two diagonally opposite angles. In the case of a product 32 with square cross section, the magnetic flux 33 is perpendicular to two opposite lateral adjacent faces of the product and the induced flux 34 is perpendicular to the two other lateral and adjacent faces of the product 32. Heating of the product in the vicinity of the two edge zones is thus obtained.

By moving the magnetic circuits 26 and 26' with respect to each other in transverse directions, it is possible selectively to produce a localized heating of the product in certain zones of its cross section.

It is to be noted that the device represented in FIG. 3 allows the air gap to be adjusted, for example when the product is introduced and as the deformed parts of this product pass through, without using a jointed magnetic yoke, the adjustment being performed simply by moving the two magnetic circuits.

Figure 4:
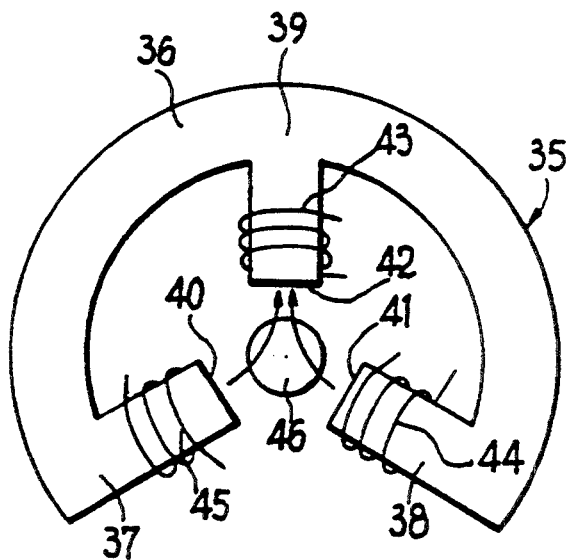
FIG. 4 is a diagrammatic front view of a third embodiment of an inductor according to the invention including three poles disposed at 120° around the axis of the advancing product.

FIG. 4 represents a second variant embodiment on an inductor 35 according to the invention.

This inductor consists of a yoke 36 made in a laminated form whose cross section has a part in the shape of a portion of a ring and three radial branches 37, 38 and 39 whose ends respectively constitute three poles 40, 41 and 42 of the inductor.

The radial branches 37, 38 and 39 carry electrical windings 43, 44 and 45 respectively, in the vicinity of the poles 40, 41 and 42.

The inductor 35 makes it possible to heat a product 46 (for example with circular cross section) advancing between the poles 40, 41 and 42, in the direction of its axis.

The windings 43, 44 and 45 may be supplied with three-phase current at a certain frequency and having a certain intensity so as to generate induced fluxes which are transverse with respect to the longitudinal direction of the product 46 between the poles 40, 41 and 42.

The windings may be supplied in different ways, for example so that the poles 40 and 41 constitute positive poles whereas the pole 42 constitutes a negative pole, in order to ensure the circulation of two transverse fluxes in desired directions in order to ensure localised heating of the product in given zones.

It is also obvious that the central branch 39 may be free of windings, the magnetic field being created by the windings carried by the radial branches 37 and 38 of the magnetic circuit alone.

It is also quite obvious that in all the embodiments hitherto described, the windings may be disposed around the yoke of the corresponding circuit in a position which is not next to one pole end of the yoke. However, in this case, the efficiency of the inductor is reduced.

It is to be noted that the shape and disposition of the magnetic circuit or circuits constituting the inductor according to the invention are adapted to the shape of the product and to the heating effect sought.

For example, when it is desired to perform preferential or additional heating of the corners of a product with square cross section, the inductor represented in FIG. 3 is particularly well suited.

In the case where it is desired to carry out the heating of two lateral zones of the product which are situated in its upper part on either side of its vertical plane of symmetry, the inductor represented in FIG. 4 is particularly well suited. This inductor produces only a very limited heating of the lower part of the product.

So as to produce better coupling between the product and the poles of the inductor by reducing the value of the air gap in order to obtain greater electrical efficiency, it is possible to adopt a pole shape as represented in FIGS. 5 and 6.

In the case of a product 50 with a circular cross section, it is possible to use a pole surface 51 in the shape of a portion of a cylinder.

In the case of a long product 52 with polygonal cross section, for example with square cross section, it is possible to use a pole surface 53 consisting of two angularly disposed plane parts.

It is also possible to imagine other inductors having pole parts which have an adapted shape and which are used in the desired number in order to heat certain zones of parts which have complex cross sections such as rails. It will for example be possible to imagine pole parts disposed around the rail so as to ensure heating solely of the rolling part of the rail, excluding its support part. In every case however, the inductor used must have pole parts allowing at least two fluxes to be generated with directions which are transverse with respect to the cross section of the product advancing between the pole parts.

The method and the devices according to the invention may therefore be used in order to carry out heating during the passage of any long product, whatever the shape of the cross section of this long product and whatever the shape and disposition of zones of this product in which it is necessary preferentially to produce the heating.

We claim:

1. Method for induction heating of an elongated metallurgical product with an axis of symmetry; which comprises:

advancing the product in the direction of the longitudinal axis thereof with respect to at least one magnetic inductor fitted with windings;

subjecting the product to at least two magnetic fluxes about the axis of symmetry of the product having non-parallel directions, which are transverse with respect to the longitudinal axis of the product, the fluxes circulating between at least three poles of the inductor wherein said poles are equi-angularly distributed around the axis of the symmetry of the product.

2. Heating method according to claim 1, which comprises passing the magnetic fluxes through the product while said product is advanced in the direction of the longitudinal axis through two zones spaced apart along the longitudinal axial direction of the product corresponding to its direction of advance, the inductor including two pairs of poles facing each other and each disposed in one of the two zones spaced apart in the longitudinal axial direction.

3. Heating method according to claim 2, wherein the fluxes (19, 19') are orthogonal to the longitudinal axis of said product.

4. Heating method according to claim 1, which comprises passing the magnetic fluxes through the advancing product, substantially in the same cross-sectional plane of the product wherein the inductor includes at least three poles disposed in the same zone.

5. Device for induction heating during the passage of an elongated metallurgical product with an axis of symmetry in the direction of the longitudinal axis with respect to at least one magnetic inductor which comprises:
a magnetic inductor having at least one magnetic yoke and including at least three poles fitted with windings equi-angularly distributed around the axis of symmetry of the product so as to form, around the product when in motion in the direction of the longitudinal axis, at least two air gaps; and
a plurality of windings which are provided at each of said poles wherein two magnetic fluxes are circulated which are transverse with respect to the longitudinal axis of the product and are not parallel to each other, by the windings.

6. Heating device according to claim 5, wherein the inductor includes two C-shaped yokes disposed perpendicularly to each other and spaced apart along the axial direction of passage of the product.

7. Heating device according to claim 5, wherein the inductor includes two yokes in the shape of a frame with a square cross section, two successive sides of which are cut out in order to form two mutually perpendicular pole surfaces, the two yokes disposed substantially in the same cross-sectional plane of the product such that said product advances through the air gaps constituted by the pole faces of the yokes.

8. Heating device according to claim 5, wherein the inductor includes a yoke having a part in the shape of a portion of a ring and three radial branches directed towards a radially inner portion of the ring and wherein the branches have inner ends which comprise the pole faces of the inductor.

9. Heating device according to any one of claims 5 to 8, wherein the pole faces of the yoke of the inductor are shaped like a portion of a cylinder.

10. Heating device according to any one of claims 5 to 8, wherein the pole faces of the yoke of the inductor are delimited by two plane faces disposed angularly with a reflex angle.

* * * * *